(12) United States Patent
Takeshita et al.

(10) Patent No.: US 7,205,727 B2
(45) Date of Patent: Apr. 17, 2007

(54) POWER SUPPLY CIRCUIT AND POWER SUPPLY CONTROL METHOD THEREIN

(75) Inventors: Junji Takeshita, Atsugi (JP); Masayuki Suzuki, Atsugi (JP); Keisuke Yamazato, Atsugi (JP); Tomomitsu Ohara, Atsugi (JP); Tomiyuki Nagai, Atsugi (JP); Naoshi Tokuda, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 47 days.

(21) Appl. No.: 10/984,067

(22) Filed: Nov. 9, 2004

(65) Prior Publication Data

US 2005/0169022 A1 Aug. 4, 2005

(30) Foreign Application Priority Data

Jan. 30, 2004 (JP) ............................. 2004-024425

(51) Int. Cl.
*H05B 37/02* (2006.01)
(52) U.S. Cl. .................... 315/291; 315/307; 363/89
(58) Field of Classification Search ................ 315/299, 315/224, 307, 129, 315, 77, 121, 151, 158, 315/159; 363/81–89, 126; 345/82, 102
See application file for complete search history.

(56) References Cited

U.S. PATENT DOCUMENTS

| | | | |
|---|---|---|---|
| 4,682,147 A * | 7/1987 | Bowman | 340/815.45 |
| 5,739,639 A * | 4/1998 | Johnson | 315/86 |
| 6,137,816 A | 10/2000 | Kinbara | |
| 6,320,330 B1 * | 11/2001 | Haavisto et al. | 315/291 |
| 6,580,222 B2 * | 6/2003 | Buell et al. | 315/169.3 |

(Continued)

FOREIGN PATENT DOCUMENTS

| | | |
|---|---|---|
| EP | 1322139 | 6/2003 |
| JP | 2002-258363 | 9/2002 |

OTHER PUBLICATIONS

Logic Power Drives High-intensity LED's Sherman L., Electronic Design, Penton Mesia, Cleveland, OH, vol. 45, No. 23, Oct. 23, 1997, pp. 142, 144.*

(Continued)

*Primary Examiner*—Rajnikant B. Patel
(74) *Attorney, Agent, or Firm*—Ladas & Parry LLP

(57) ABSTRACT

A power supply circuit is disclosed that includes a coil with first and second ends having supply voltage applied to the first end, a first switching element connected between the second end of the coil and ground, a second switching or diode element supplying current to a load after rectifying the current in accordance with voltage generated at the connection of the coil and the first switching element, a driver circuit switching at least the first switching element, a third switching element connected in series to the load, and a power supply stop circuit switching off the first element so as to stop supplying power to the load and switching off the third element so as to stop supplying the current to the load in accordance with an external signal.

9 Claims, 7 Drawing Sheets

U.S. PATENT DOCUMENTS

| | | | |
|---|---|---|---|
| 6,747,420 B2 * | 6/2004 | Barth et al. | 315/291 |
| 6,791,283 B2 * | 9/2004 | Bowman et al. | 315/291 |
| 6,870,328 B2 * | 3/2005 | Tanabe et al. | 315/291 |
| 2002/0047642 A1 | 4/2002 | Miyagawa | |
| 2003/0117087 A1 | 6/2003 | Barth et al. | |
| 2004/0251854 A1 | 12/2004 | Matsuda et al. | |

OTHER PUBLICATIONS

'Logic Power Drives High-Intensity LEDs' Sherman L., Electronic Design, Penton Media, Cleveland, OH, vol. 45, No. 23, Oct. 23, 1997, pp. 142, 144.

* cited by examiner

POWER SUPPLY CIRCUIT AND POWER SUPPLY CONTROL METHOD THEREIN

BACKGROUND OF THE INVENTION

1. Field of the Invention

The present invention relates generally to power supply circuits and power supply control methods therein, and more particularly to a power supply circuit and a power supply control method therein, the power supply circuit including a coil having supply voltage applied to one end thereof, a first switching element connected between the other end of the coil and ground, a second switching or diode element rectifying and supplying current to be supplied to a load in accordance with voltage generated at the connection of the coil and the first switching element, and a driver circuit switching at least the first switching element.

2. Description of the Related Art

FIG. 1 is a block diagram showing a conventional power supply circuit 1.

Referring to FIG. 1, the power supply circuit 1 includes a coil L, a boost control circuit 11, and a Schottky barrier diode D0 for rectification. A DC power supply 2 is connected to one end (a first end) of the coil L so that supply voltage Vcc is applied thereto. The boost control circuit 11 controls current flowing through the coil L. The Schottky barrier diode D0 rectifies current to a load 3 in accordance with voltage generated at the connection of the coil L and the boost control circuit 11, and supplies the current to the load 3.

The boost control circuit 11 includes an error amplifier 21, a comparator 22, an oscillator circuit 23, a driver 24, a transistor 25, and a power supply stop circuit 26. The boost control circuit 11 is driven by the supply voltage $V_{CC}$ supplied to a terminal T1 from the DC power supply 2.

The error amplifier 21 is connected to a terminal T3. The terminal T3 is connected to the connection of the load 3 and one end of a detection resistor Rs. The other end of the detection resistor Rs is grounded through terminals T4 and T5. The error amplifier 21 amplifies voltage at the connection of the load 3 and the detection resistor Rs, and supplies the amplified voltage to the comparator 22.

A detection signal from the error amplifier 21 and an oscillation signal from the oscillator circuit 23 are provided to the comparator 22. The oscillator circuit 23 generates a sawtooth or triangle wave oscillation signal. The comparator 22 compares the magnitudes of the detection signal provided from the error amplifier 21 and the sawtooth or triangle wave oscillation signal provided from the oscillator circuit 23. As a result, the comparator 22 generates a pulse signal whose pulse width increases as the detection signal level lowers and decreases as the detection signal level rises. The pulse signal generated in the comparator 22 is provided to the driver 24.

The driver 24 switches on and off the transistor 25 in accordance with the pulse signal provided from the comparator 22. The transistor 25 has a drain thereof connected to the other end (a second end) of the coil L through a terminal T2 and a source thereof grounded.

When the transistor 25 is switched on by the pulse signal provided from the driver 24, voltage at the terminal 2 is increased by the electromotive force of the coil L in accordance with the cycle of the pulse signal.

The connection of the second end of the coil L and the terminal T2 is connected to the load 3 via the Schottky barrier diode D0. The Schottky barrier diode D0 is connected in the forward direction toward the load 3 between the connection of the second end of the coil L and the terminal T2 and the load 3.

The voltage at the terminal T2 increased by the coil L is supplied to the load 3 via the Schottky barrier diode D0.

The load 3 is composed of, for instance, light emitting diodes D11 through D14. The light emitting diodes D11 through D14 are connected in series and caused to emit light by the increased voltage. As related art, a lighting device that causes a light emitting diode to emit light by voltage increased by a power supply circuit has been disclosed in Japanese Laid-Open Patent Application No. 2002-258363.

However, according to the conventional power supply circuit 1 shown in FIG. 1, the increasing of voltage, the supplying of the increased voltage to the load 3, and the operation of the load 3 are stopped by maintaining the transistor 25 in OFF state. At this point, the DC power supply 2 and the load 3 are connected via the Schottky barrier diode D0, which is connected in the forward direction with respect to the coil L and the supply voltage $V_{CC}$. Therefore, when the transistor 25 is switched off, the supply voltage Vcc is applied to the load 3 through the Schottky barrier diode D0, so that a small current flows through the load 3.

This increases power consumption. Further, when the load 3 is a light emitting diode as in this case, there is a problem in that the light emitting diode emits light.

SUMMARY OF THE INVENTION

Accordingly, it is a general object of the present invention to provide a power supply circuit and a power supply control method therein in which the above-described disadvantage is eliminated.

A more specific object of the present invention is to provide a power supply circuit and a power supply control method therein that can reduce power consumption.

The above objects of the present invention are achieved by a power supply circuit including: a coil having first and second ends, the coil having supply voltage applied to the first end thereof; a first element connected between the second end of the coil and ground, the first element being a switching element; a second element configured to rectify current to be supplied to a load in accordance with voltage generated at a connection of the coil and the first element, and to supply the current to the load; a driver circuit configured to switch at least the first element; a third element connected in series to the load, the third element being a switching element; and a power supply stop circuit configured to switch off the first element so as to stop supplying power to the load and switch off the third element so as to stop supplying the current to the load in accordance with an external signal.

The above objects of the present invention are also achieved by a method of controlling supply of power in a power supply control circuit including a coil having first and second ends, the coil having supply voltage applied to the first end thereof; a first element connected between the second end of the coil and ground, the first element being a switching element; a second element configured to rectify current to be supplied to a load in accordance with voltage generated at a connection of the coil and the first element, and to supply the current to the load; and a driver circuit configured to switch at least the first element, wherein a third element is connected in series between the load and the ground, the third element being a switching element; and the third element is switched off when supplying the power to the load is stopped.

According to one embodiment of the present invention, in a power supply circuit including a coil having first and second ends, the coil having supply voltage applied to the first end thereof, a first element connected between the second end of the coil and ground, the first element being a switching element; a second element rectifying current to be supplied to a load in accordance with voltage generated at the connection of the coil and the first element, and supplying the current to the load, and a driver circuit switching at least the first element, a third element, which is a switching element, is connected in series between the load and the ground. When supplying power to the load is stopped, by switching off the third element, it is possible to prevent supply voltage from being supplied to the load through the coil and the second element for rectification in a state where the first element is switched off so that supplying increased voltage to the load is stopped. As a result, power consumption during the stoppage of the load can be reduced. Further, it is possible to prevent the load from being driven by a small current when the load is stopped.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

A description is given below, with reference to the accompanying drawings, of embodiments of the present invention.

First Embodiment

Figure 1:
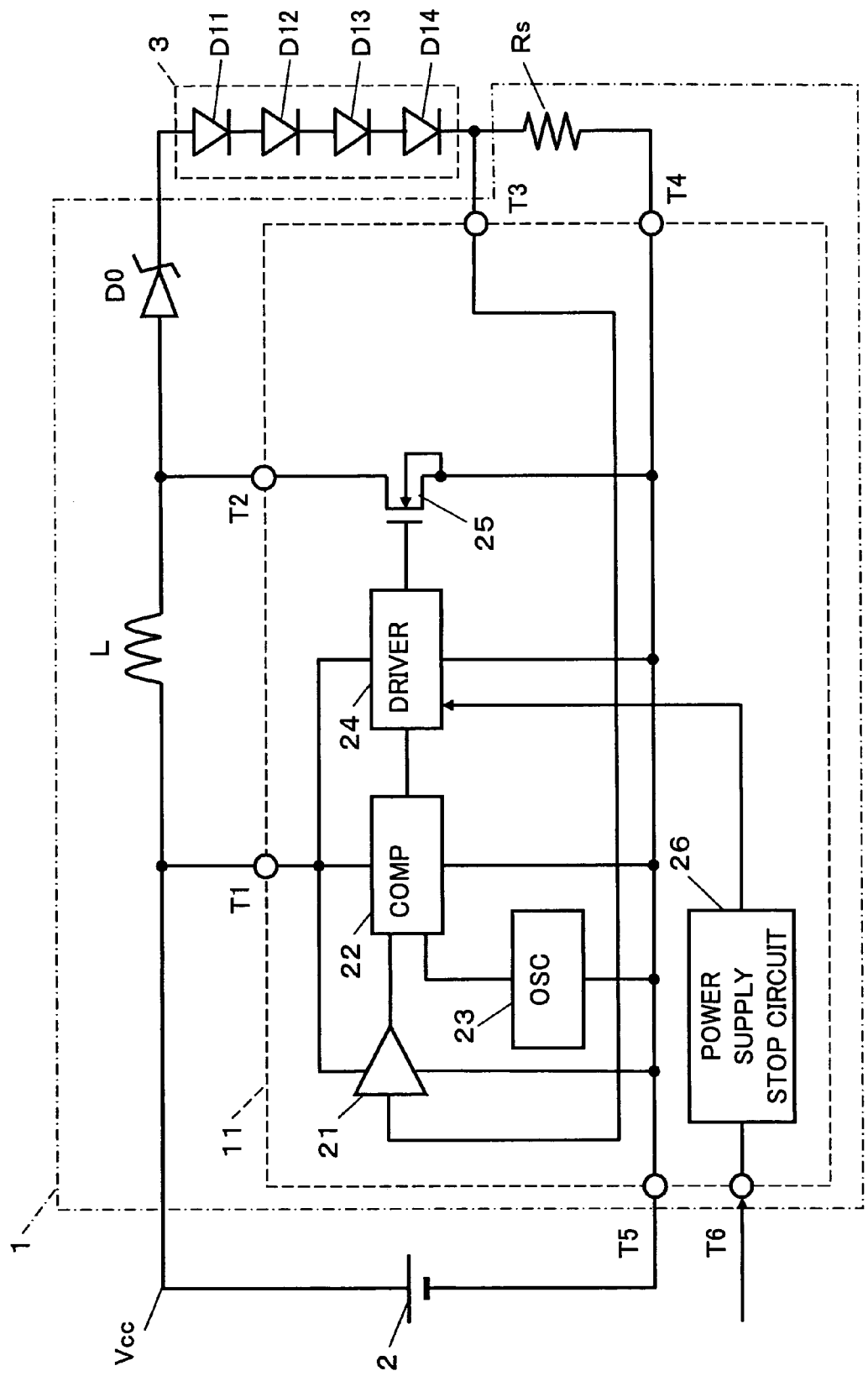
FIG. 1 is a block diagram showing a conventional power supply circuit.
Figure 2:
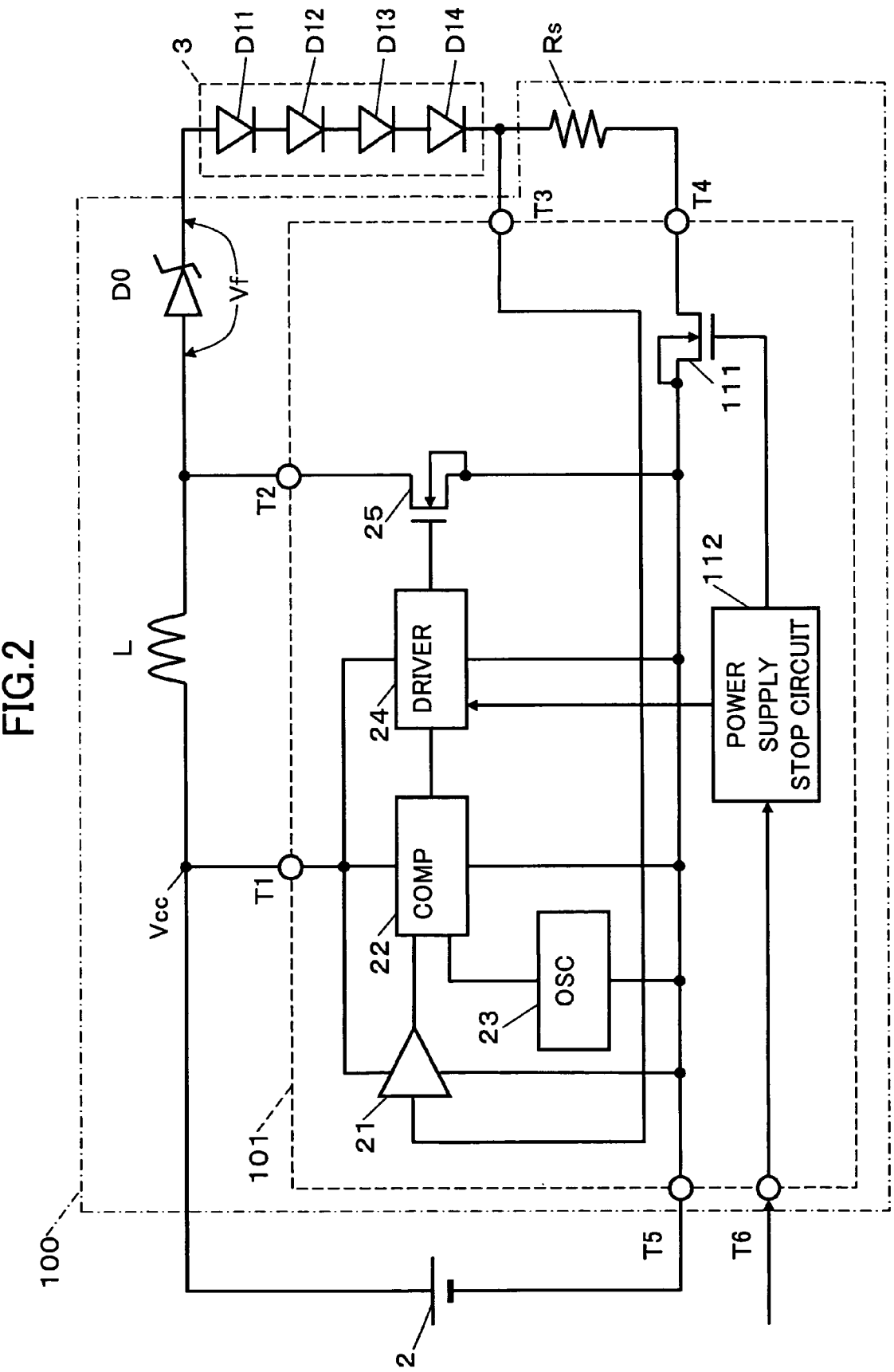
FIG. 2 is a block diagram showing a power supply circuit according to a first embodiment of the present invention.

FIG. 2 is a block diagram showing a power supply circuit 100 according to a first embodiment of the present invention. In FIG. 2, the same elements as those of FIG. 1 are referred to by the same numerals, and a description thereof is omitted.

The power supply circuit 100 of this embodiment is different from the conventional power supply circuit 1 (FIG. 1) in the configuration of a boost control circuit.

The power supply circuit 100 includes a boost control circuit 101. The boost control circuit 101, which is formed of an IC (integrated circuit) chip, includes the error amplifier 21, the comparator 22, the oscillator circuit 23, the driver 24, the transistor 25, a transistor 111, and a power supply stop circuit 112. In this embodiment, the transistor 25 forms a first switching element, the Schottky barrier diode D0 for rectification forms a second switching or diode element, and the transistor 111 forms a third switching element.

The transistor 111 is formed of, for instance, an n-channel MOS field effect transistor (MOSFET), and has a drain thereof connected to the terminal T4 and a source thereof connected to the terminal T5. A parasitic diode is connected to the transistor 111 in the forward direction from the terminal T5 to the terminal T4. A switching control signal is provided from the power supply stop circuit 112 to the gate of the transistor 111.

[At the time of supplying power]

The power supply stop circuit 112 is connected to a terminal T6. A stop instruction signal is provided to the terminal 6 from a host apparatus. When the terminal T6 turns LOW (low level) based on the stop instruction signal provided from the host apparatus, the power supply stop circuit 112 enters a state to drive the load 3. The power supply stop circuit 112 switches a control signal provided to the driver 24 to LOW, and switches the gate of the transistor 111 to HIGH (high level).

When the control signal from the power supply stop circuit 112 to the driver 24 turns LOW, the driver 24 enters an operative state, and provides a pulse signal in accordance with the output of the comparator 22 to the gate of the transistor 25.

The transistor 25 is switched on and off in accordance with the pulse signal provided from the driver 24. When the transistor 25 is switched on, current flows through the coil L. As a result of the current flowing through the coil L, electromagnetic energy is stored therein in accordance with the flowing current. Next, when the transistor is switched off, increased voltage is generated at the second end of the coil L in accordance with a back electromotive force. The increased voltage generated at the second end of the coil L is applied to the load 3 via the Schottky barrier diode D0.

[At the time of stopping supplying power]

When the terminal T6 turns HIGH based on the stop instruction signal provided from the host apparatus, the power supply stop circuit 112 switches the control signal provided to the driver 24 to HIGH, and switches the gate of the transistor 111 to LOW.

When the control signal provided from the power supply stop circuit 112 to the driver 24 turns HIGH, the driver 24 enters an inoperative state, and maintains the gate of the transistor 25 at LOW irrespective of the output of the comparator 22.

When the gate of the transistor 25 is held at LOW, the transistor 25 is maintained in OFF state. When the transistor 25 is maintained in OFF state, no change is caused in the current flowing through the coil L. Accordingly, the supply voltage from the power supply 2 is not increased, and is applied to the connection of the coil L and the Schottky barrier diode D0. Therefore, voltage obtained by subtracting the forward direction voltage Vf of the Schottky barrier diode D0 from the supply voltage $V_{CC}$ ($V_{CC}-Vf$) is applied to the load 3.

When the switching control signal provided from the power supply stop circuit 112 to the transistor 111 turns LOW, the gate of the transistor 111 is switched to LOW, so that the transistor 111 is switched off. When the transistor 111 is switched off, the terminal T4 becomes open. When the terminal T4 becomes open, no current flows through the load 3 and the detection resistor Rs.

[Effects]

Thus, when the operation of increasing voltage (a voltage increase operation) is stopped, current is prevented from flowing through the load 3, thus preventing unnecessary power consumption. Accordingly, power consumption can be reduced.

Further, the transistor 111 can be reduced in size by being provided on the ground side of the load 3.

According to this embodiment, the power supply stop circuit 112 stops the operation of the driver 24, thereby switching off the transistor 25. Alternatively, it is also possible to switch off the transistor 25 by a feedback loop for controlling the current of the load 3 without the power supply stop circuit 112 controlling the operation of the driver 24.

In this case, first, the power supply stop circuit 112 switches off the transistor 111 at the time of stopping supplying power. When the transistor 111 is switched off, electric potential at the terminal T3 increases greatly compared with a normal operation period. When the electric potential at the terminal T3 increases greatly, the output of the comparator 22 is constantly kept LOW. When the output of the comparator 22 is constantly kept LOW, the transistor 25 is constantly kept OFF by the driver 24. Accordingly, the transistor 25 can be switched off by normal operation without the power supply stop circuit 112 controlling the operation of the driver 24. At this point, current flowing through the terminal T3 is so small that current of such magnitude as to cause the diodes D11 through D14 to emit light is prevented from flowing through the diodes D11 through D14.

Second Embodiment

Figure 3:
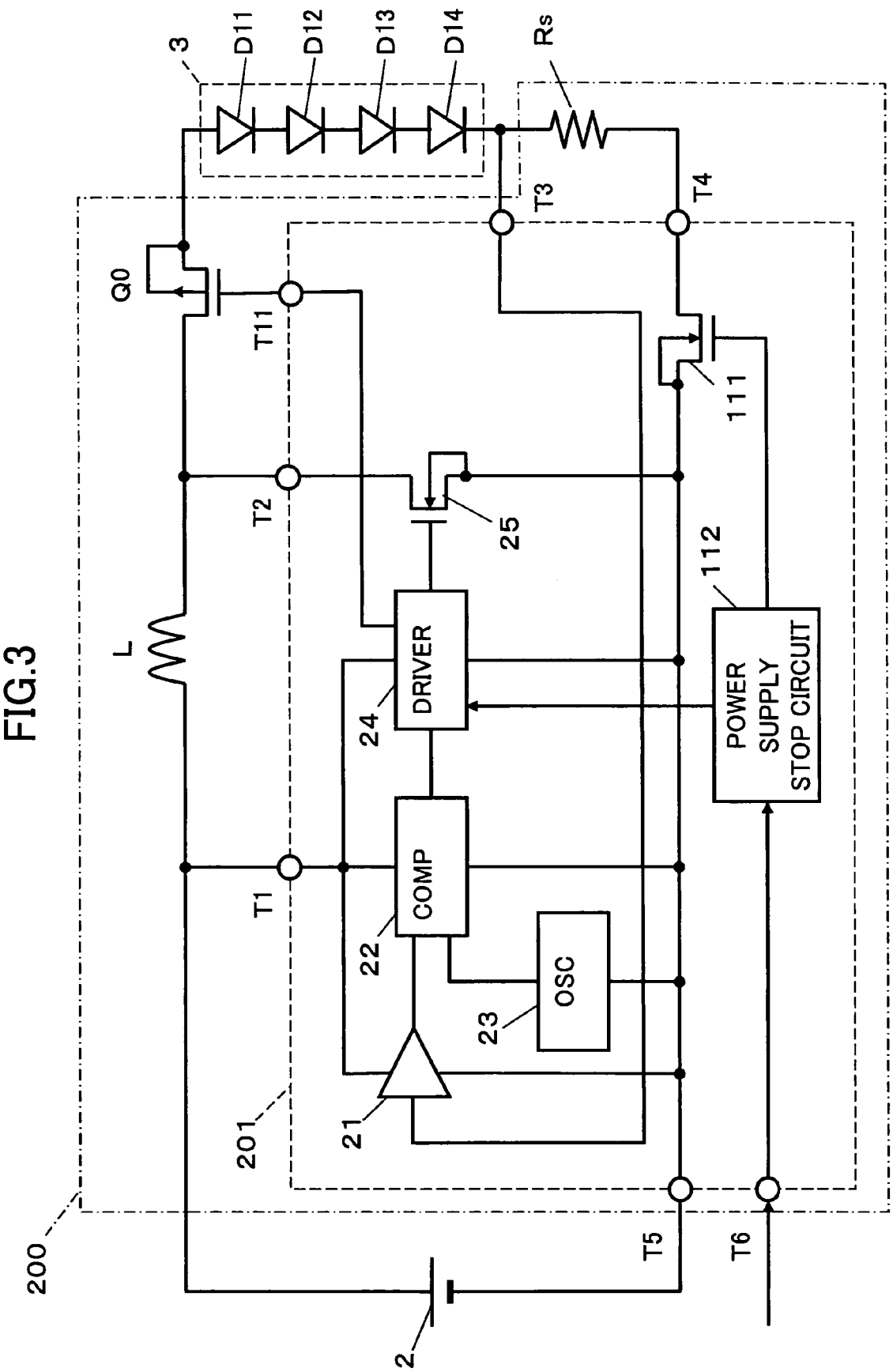
FIG. 3 is a block diagram showing a power supply circuit according to a second embodiment of the present invention.

FIG. 3 is a block diagram showing a power supply circuit 200 according to a second embodiment of the present invention. In FIG. 3, the same elements as those of FIG. 2 are referred to by the same numerals, and a description thereof is omitted.

This embodiment is an application of the present invention to a power supply circuit of a synchronous rectification type.

In contrast to the power supply circuit 100 of the first embodiment (FIG. 2), the power supply circuit 200 of this embodiment employs a p-channel MOSFET Q0 instead of the Schottky barrier diode D0 as the second switching or diode element.

The power supply circuit 200 includes a boost control circuit 201. The boost control circuit 201 is formed of a single-chip IC. The driver 24 of the boost control circuit 201 controls the transistor 25, and also controls the transistor Q0 via a terminal T11. At this point, the transistor Q0 and the transistor 25 are switched on (off) alternately so that so-called synchronous rectification is performed.

The terminal T11 is connected to the gate of the transistor Q0 forming the second switching or diode element. The transistor Q0 is switched on when the transistor 25 (the first switching element) is switched off, and is switched off when the transistor 25 is switched on.

Accordingly, when the voltage at the second end of the coil L is increased, the transistor Q0 is switched on so that the increased voltage is applied to the load 3. On the other hand, when the voltage at the second end of the coil L is decreased, the transistor Q0 is switched off so as to prevent voltage drop at one end of the load 3.

Thus, a so-called synchronous rectification operation, in which rectification is performed by synchronizing the transistor Q0, which is the second switching or diode element, with the transistor 25, which is the first switching element, is performed.

Third Embodiment

Figure 4:
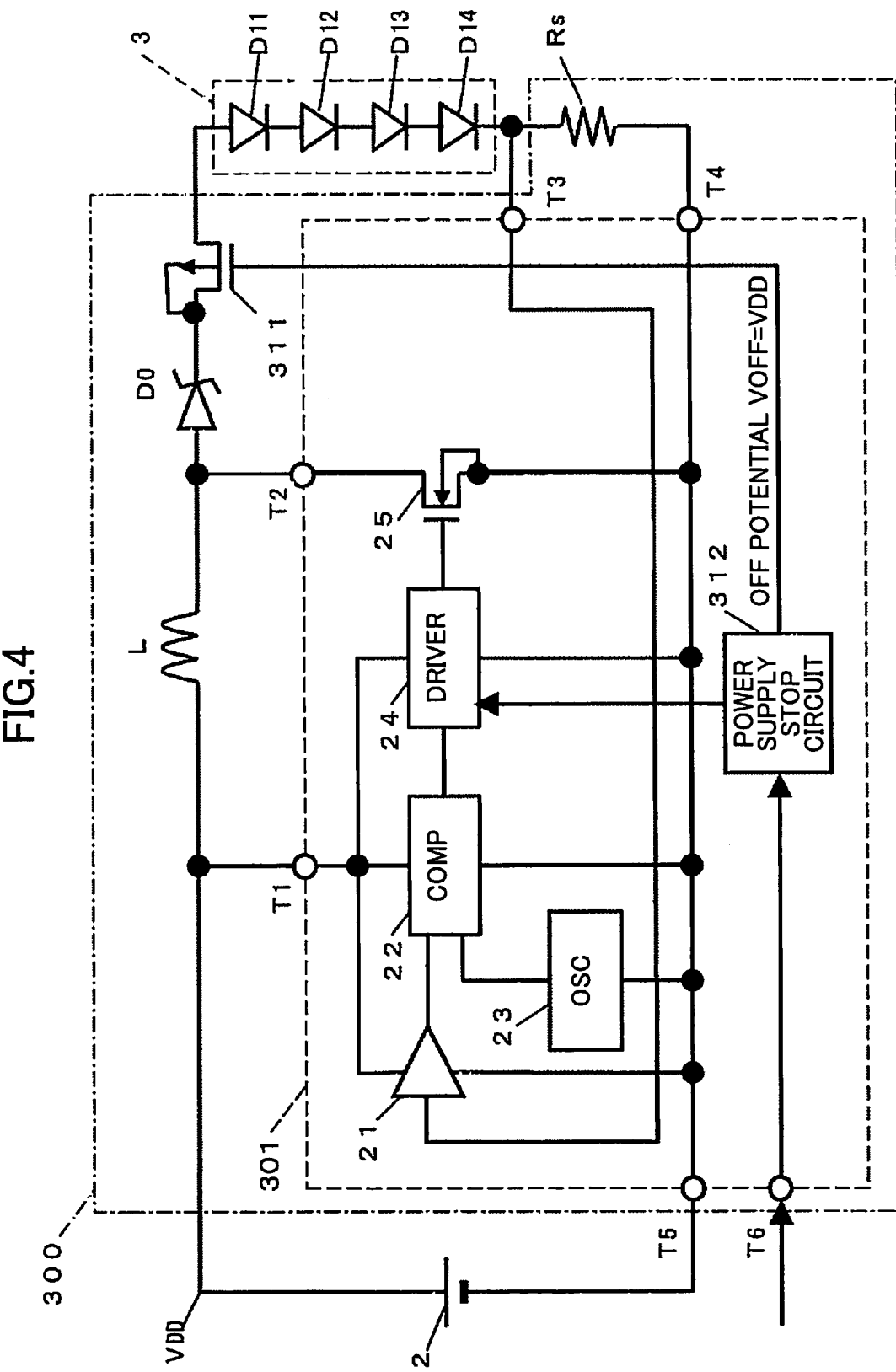
FIG. 4 is a block diagram showing a power supply circuit according to a third embodiment of the present invention.

FIG. 4 is a block diagram showing a power supply circuit 300 according to a third embodiment of the present invention. In FIG. 4, the same elements as those of FIG. 2 are referred to by the same numerals, and a description thereof is omitted.

The power supply circuit includes a transistor 311 serving as a third switching element connected in series between the diode D0 and the load 3.

The transistor 311 is formed of a p-channel MOSFET transistor. The source, drain, gate, and back gate of the transistor 311 are connected to the cathode of the diode D0, the load 3, a power supply stop circuit 312 of a boost control circuit 301, and the gate of the transistor 311, respectively.

The power supply stop circuit 312 provides a switching control signal to the transistor 311. The voltage level of the switching control signal at the time of the power supply stop circuit 312 switching off the transistor 311 (OFF potential $V_{OFF}$) is approximately equal to the supply voltage $V_{DD}$ supplied from the power supply 2.

Next, a description is given of an operation according to this embodiment.

Figure 5:
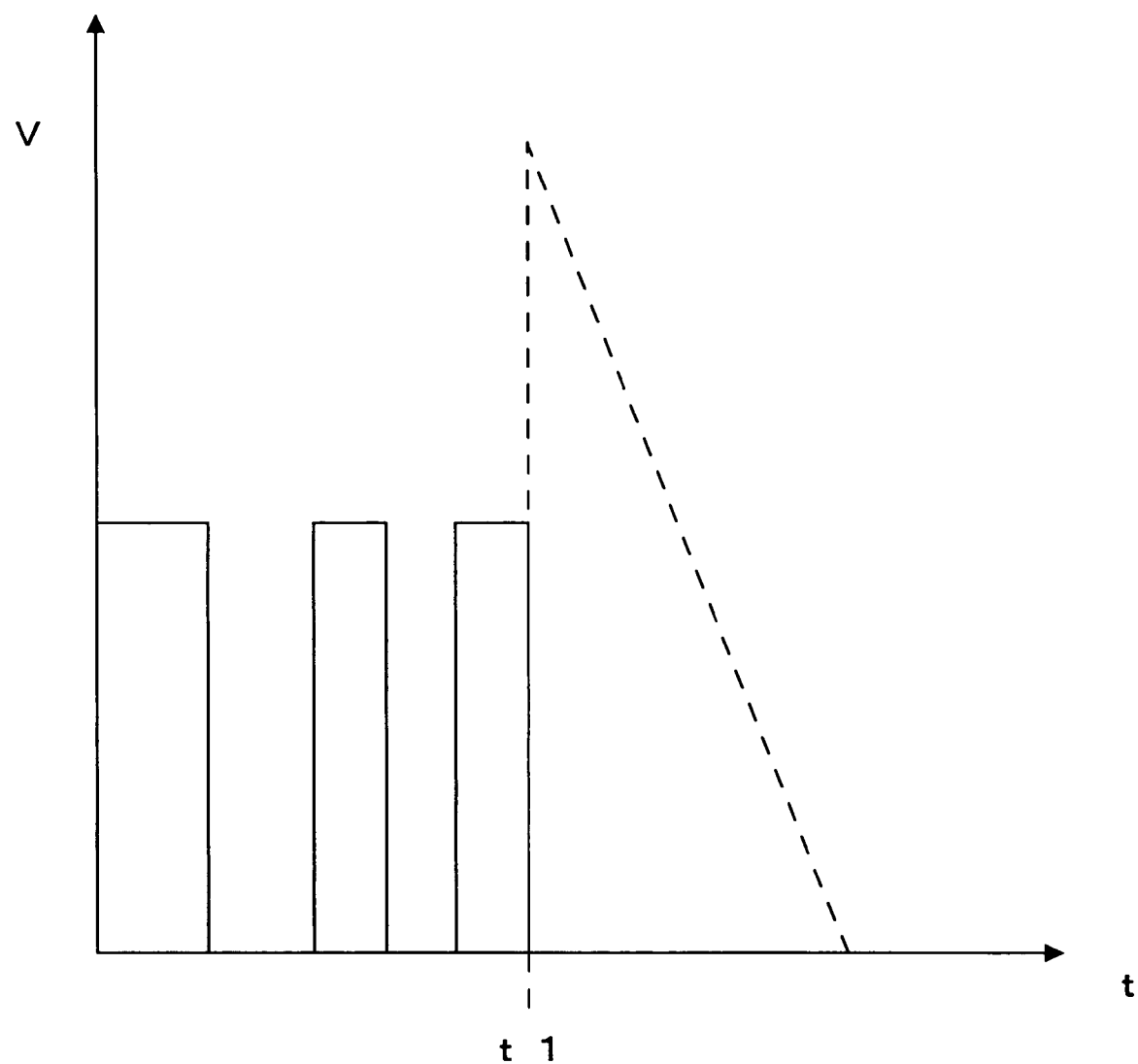
FIG. 5 is a waveform chart according to the third embodiment of the present invention.

FIG. 5 is a waveform chart according to the third embodiment of the present invention.

When the transistor 311 is switched off with the transistor 25 being in OFF state at Time t1 in order to cut off the supply of power to the load 3, the back electromotive force of the coil L causes the potential at the terminal T2 to be higher than the supply voltage $V_{DD}$. At this point, the gate potential of the transistor 311 is approximately equal to the supply voltage $V_{DD}$. Therefore, the transistor 311 is switched on, so that current flows from the coil L to the load 3.

As a result, a significant increase in the drain potential of the transistor 25 as indicated by broken lines in FIG. 5 can be prevented at the time of cutting off the supply of power. Accordingly, it is possible to prevent damage to the transistor 25 due to an increase in the potential at the terminal T2 because of the back electromotive force of the coil L at the time of cutting off the supply of power.

Fourth Embodiment

Figure 6:
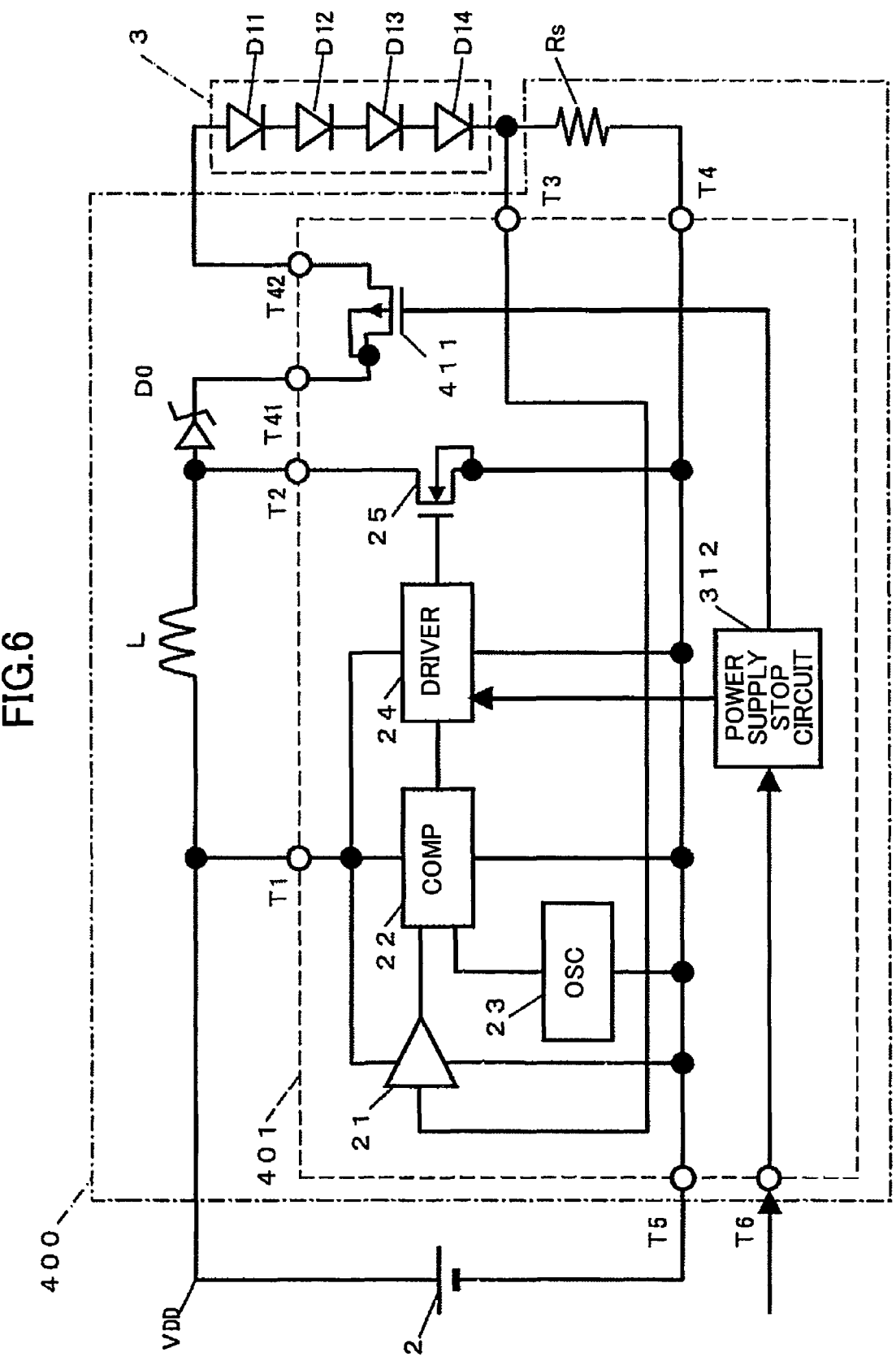
FIG. 6 is a block diagram showing a power supply circuit according to a fourth embodiment of the present invention.

FIG. 6 is a block diagram showing a power supply circuit 400 according to a fourth embodiment of the present invention. In FIG. 6, the same elements as those of FIG. 4 are referred to by the same numerals, and a description thereof is omitted.

The power supply circuit 400 according to this embodiment is different from the power supply circuit 300 of the third embodiment in the configuration of a boost control circuit. The power supply circuit 400 includes a boost control circuit 401. In the boost control circuit 401, a transistor 411 serving as a third switching element is contained in an IC chip forming the boost control circuit 401, and terminals T41 and T42 are provided.

The terminal T41 is connected to the source of the transistor 411 inside the boost control circuit 401, and is connected to the cathode of the diode D0 outside the boost control circuit 401. Further, the terminal T42 is connected to the drain of the transistor 411 inside the boost control circuit 401, and is connected to the load 3 outside the boost control circuit 401.

According to this embodiment, the number of externally attached components can be reduced. Accordingly, the power supply circuit 400 can be reduced in size and cost.

Fifth Embodiment

Figure 7:
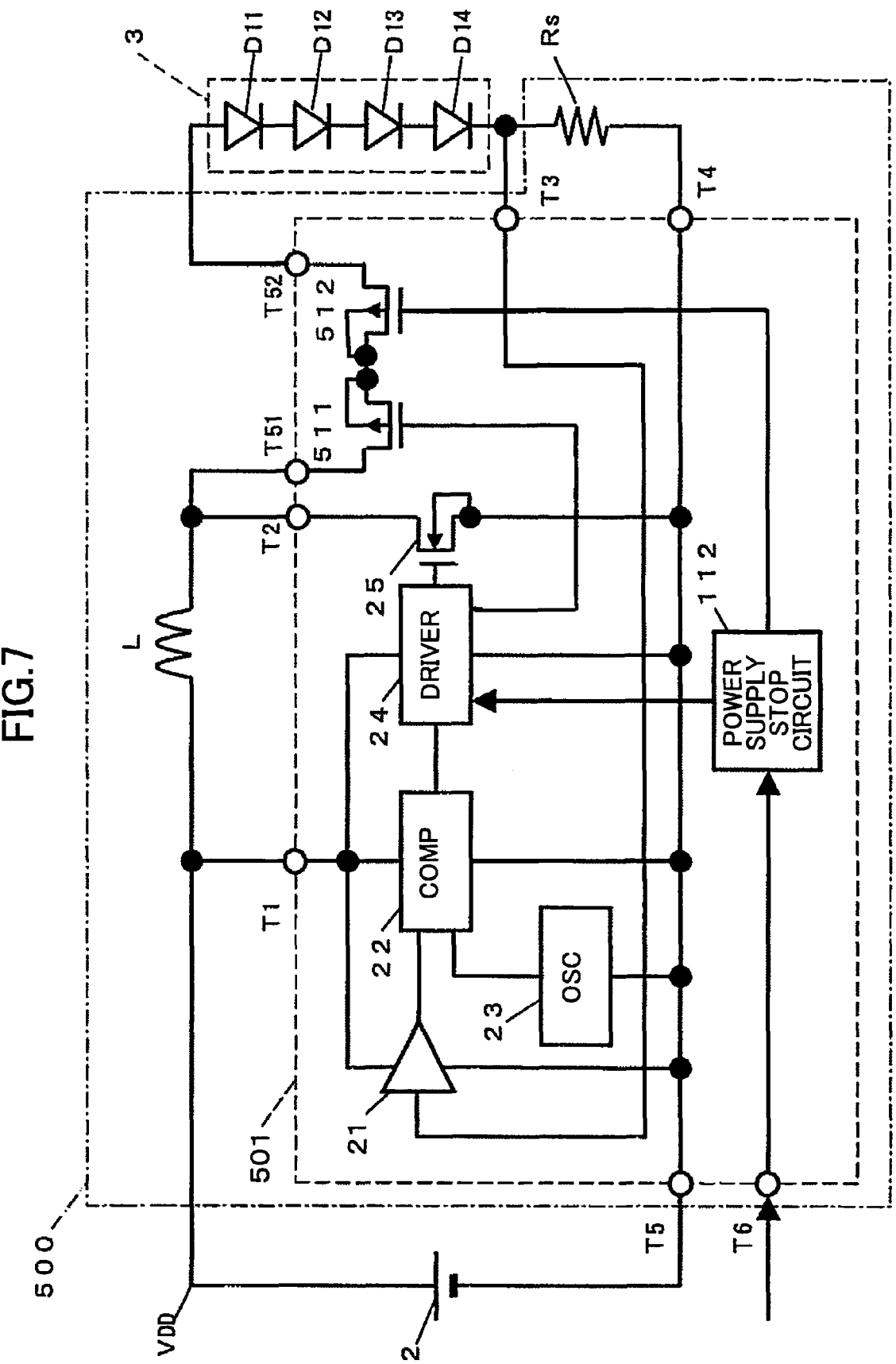
FIG. 7 is a block diagram showing a power supply circuit according to a fifth embodiment of the present invention.

FIG. 7 is a block diagram showing a power supply circuit 500 according to a fifth embodiment of the present invention. In FIG. 7, the same elements as those of FIG. 3 are referred to by the same numerals, and a description thereof is omitted.

The power supply circuit 500 according to this embodiment is different from the power supply circuit 200 of the second embodiment in the configuration of a boost control circuit. The power supply circuit 500 includes a boost control circuit 501. In the boost control circuit 501, a transistor 511 serving as a second switching or diode element and a transistor 512 serving as a third switching element are contained in an IC chip forming the boost control circuit 501, and terminals T51 and T52 are provided.

The terminal T51 is connected to the source of the transistor 511 inside the boost control circuit 501, and is connected to the connection of the second end of the coil L and the terminal T2 outside the boost control circuit 501. The source of the transistor 511 is connected to the source of the transistor 512. A switching control signal is provided from the driver 24 to the gate of the transistor 511. The transistor 511 is switched alternately with the transistor 25, which is the first switching element, by the switching control signal provided from the driver 24.

The drain of the transistor 512 is connected to the terminal T52. The terminal T52 is connected to the load 3 outside the boost control circuit 501. The transistor 512 is switched by a switching signal provided from the power supply stop circuit 112. The transistor 512 is switched off at the time of stopping supplying power to the load 3, so that leakage current is prevented from flowing through the load 3.

According to this embodiment, the number of externally attached components can be reduced. Accordingly, the power supply circuit 400 can be reduced in size and cost.

The present invention is not limited to the specifically disclosed embodiments, and variations and modifications may be made without departing from the scope of the present invention.

The present application is based on Japanese Priority Patent Application No. 2004-024425, filed on Jan. 30, 2004, the entire contents of which are hereby incorporated by reference.

What is claimed is:

1. A power supply circuit, comprising:
a coil having first and second ends, the coil having supply voltage applied to the first end thereof;
a first element connected between the second end of the coil and ground, the first element being a switching element;
a second element configured to rectify current to be supplied to a load in accordance with voltage generated at a connection of the coil and the first element, and to supply the current to the load;
a driver circuit configured to switch at least the first element;
a third element connected in series between to the load and base potential, the third element being a switching element;
a resistor connected in series between the load and the third element; and
a power supply stop circuit configured to switch off the third element so as to stop supplying the current to the load in accordance with an external signal,
wherein when the power supply stop circuit switches off the third element, the driver circuit is caused to switch off the first element through a feedback loop for controlling the current to the load so that supplying power to the load is stopped, the feedback loop being provided between the driver circuit and a connection of the load and the resistor.

2. The power supply circuit as claimed in claim 1, wherein the second element comprises a diode connected in a forward direction toward the load between the connection of the coil and the first element and the load.

3. The power supply circuit as claimed in claim 1, wherein the second element is a switching element.

4. The power supply circuit as claimed in claim 3, wherein the second element is driven in synchronization with the first element by the driver circuit so as to perform synchronous rectification.

5. The power supply circuit as claimed in claim 1, wherein the third element is connected in series between the load and the second element.

6. The power supply comprising:
a coil having first and second ends, the coil having supply voltage applied to the first and thereof;
a first element connected between the second end of the coil and ground, the first element being a switchinf element;
a second element configured to rectify current to be suDolied to a load in accordance with voltage generated at a connection of the coil and the first element, and to supply the current to the load;
a driver circuit configured to switch at least the first element;
a third element connected in series to the load, the third element being a switching element; and
a power supply stop circuit configured to switch off the first element so as to stop supplying power to the load and switch off the third element so as to stop supplying the current to the load in accordance with an external signal
wherein the third element is provided inside a semiconductor integrated circuit including at least the driver circuit; and
the third element comprises an n-channel MOS field effect transistor to which a parasitic diode is connected in a reverse direction.

7. A method of controlling supply of power in a power supply control circuit including a coil having first and second ends, the coil having supply voltage applied to the first end thereof; a first element connected between the second end of the coil and ground, the first element being a switching element; a second element configured to rectify current to be supplied to a load in accordance with voltage generated at a connection of the coil and the first element, and to supply the current to the load; and a driver circuit configured to switch at least the first element, the method comprising;
connecting a third element in series between the load and the ground, the third element being a switching element;
connecting a resistor in series between the load and the third element; and
causing, when the third element is switched off, the driver circuit to switch off the first element through a feedback, loop for controlling the current to the load so that supplying power to the load is stopped, the feedback loop being provided between the driver circuit and a connection of the load and the resistor.

8. The method as claimed in claim 7, wherein the second element comprises a diode connected in a forward direction toward the load between the connection of the coil and the first element and the load.

9. The method as claimed in claim 7, wherein the second element is a switching element.

* * * * *